(12) United States Patent
Lee

(10) Patent No.: US 7,966,035 B2
(45) Date of Patent: Jun. 21, 2011

(54) SCREEN CHANGING METHOD IN MOBILE TERMINAL

(75) Inventor: Chul-Min Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 11/960,456

(22) Filed: Dec. 19, 2007

(65) Prior Publication Data

US 2008/0096611 A1    Apr. 24, 2008

Related U.S. Application Data

(63) Continuation of application No. 11/269,677, filed on Nov. 9, 2005, now Pat. No. 7,801,551.

(30) Foreign Application Priority Data

Nov. 9, 2004 (KR) .................. 10-2004-0091039

(51) Int. Cl.
*H04M 1/00* (2006.01)
(52) U.S. Cl. ............... 455/550.1; 455/566; 455/414.1
(58) Field of Classification Search .................. 455/566, 455/414.4, 418, 550.1
See application file for complete search history.

(56) References Cited

U.S. PATENT DOCUMENTS

| 6,026,161 | A | 2/2000 | Larsen et al. |
| 6,097,441 | A | 8/2000 | Allport |
| 6,608,637 | B1 | 8/2003 | Beaton et al. |
| 2002/0065111 | A1 | 5/2002 | Otsuka et al. |
| 2002/0094839 | A1 | 7/2002 | Otsuka |
| 2003/0030624 | A1 | 2/2003 | Aoyama |
| 2003/0040346 | A1 * | 2/2003 | Fukuda et al. ............. 455/575 |
| 2003/0045331 | A1 * | 3/2003 | Montebovi ................. 455/566 |
| 2003/0119562 | A1 * | 6/2003 | Kokubo ..................... 455/566 |
| 2004/0192401 | A1 | 9/2004 | Kaida |
| 2005/0059433 | A1 | 3/2005 | Nagao |
| 2005/0066366 | A1 | 3/2005 | Takamine |
| 2005/0096055 | A1 * | 5/2005 | Colban et al. ............. 455/442 |
| 2005/0130641 | A1 * | 6/2005 | Lorraine Scott .......... 455/418 |
| 2005/0164745 | A1 * | 7/2005 | Oe et al. ................... 455/566 |

FOREIGN PATENT DOCUMENTS

| EP | 0 651 544 A2 | 5/1995 |
| EP | 0 651 544 A3 | 5/1995 |
| GB | 2 322 513 A | 8/1998 |

(Continued)

*Primary Examiner* — Lester Kincaid
*Assistant Examiner* — Steven Lim
(74) *Attorney, Agent, or Firm* — Birch, Stewart, Kolasch & Birch, LLP

(57) ABSTRACT

A mobile terminal including a function key configured to select at least one of a first list of menu items and a second list of menu items, a selecting key configured to select a function from at least one of the first menu list and the second menu list, and a display configured to display at least one of the selected first list of menu items, the selected second list of menu items and the selected function. Further, the first list of menu items and the selected function are selectively displayed on a first display portion of the terminal, and the second list of the menu items is displayed on a second display portion of the terminal. The terminal also includes a controller configured to activate the function selected by the selecting key. In addition, when the activated function displayed on the first display portion is a screen occupation function which is not to be interrupted, the first display portion does not display the list of first menu items when the function key is selected.

22 Claims, 6 Drawing Sheets

FOREIGN PATENT DOCUMENTS

| | | |
|---|---|---|
| GB | 2 390 259 A | 12/2003 |
| JP | 2003-125041 A | 4/2003 |
| JP | 2003-162355 A | 6/2003 |
| JP | 2004-62369 A | 2/2004 |
| RU | 1 159 012 C2 | 11/2000 |
| WO | WO-03/077098 A1 | 9/2003 |
| WO | WO-03/077553 A1 | 9/2003 |

* cited by examiner

US 7,966,035 B2

SCREEN CHANGING METHOD IN MOBILE TERMINAL

This application is a continuation application of U.S. application Ser. No. 11/269,677, filed on Nov. 9, 2005, now U.S. Pat. No. 7,801,551 and claims priority to Korean Patent Application No. 10-2004-0091039, filed in Korea on Nov. 9, 2004. The entire contents of these applications are incorporated by reference in its entirety.

BACKGROUND OF THE INVENTION

1. Field of the Invention

The present invention relates to a mobile terminal including a display with at least two display portions, and more particularly to a mobile terminal and a method of changing or converting a current process displayed on one of the display portions of the mobile terminal according to a type of function key selected.

2. Description of the Related Art

Currently, mobile terminals include many additional features other than a basic call service. For example, it is possible to watch movies, listen to music, access the Internet, and play games on a mobile terminal. Thus, with this increase in capability, people are spending more time using their mobile terminal.

However, the related art mobile terminal generally includes only one display portion. Therefore, it is difficult for the user to simultaneously perform multiple tasks. For example, if the user is playing games on the terminal and receives a text message, the game is interrupted thereby inconveniencing the user.

SUMMARY OF THE INVENTION

Accordingly, one object of the present invention is to address the above-noted and other problems.

Another object of the present invention is to provide a screen changing method in a mobile terminal that allows a user to simultaneously perform multiple operations.

Yet another object of the present invention is to immediately output a menu option list or a task list based on a function key selected by the user.

Still another object of the present invention is to improve the integration of keys in a keypad on a mobile terminal.

To achieve these and other advantages and in accordance with the purpose of the present invention, as embodied and broadly described herein, the present invention provides in one aspect a mobile terminal including a function key configured to select at least one of a first list of menu items and a second list of menu items, a selecting key configured to select a function from at least one of the first menu list and the second menu list, and a display configured to display at least one of the selected first list of menu items, the selected second list of menu items and the selected function. Further, the first list of menu items and the selected function are selectively displayed on a first display portion of the terminal, and the second list of the menu items is displayed on a second display portion of the terminal. The terminal also includes a controller configured to activate the function selected by the selecting key. In addition, when the activated function displayed on the first display portion is a screen occupation function which is not to be interrupted, the first display portion does not display the list of first menu items when the function key is selected. The present invention also provides a corresponding screen changing method in a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
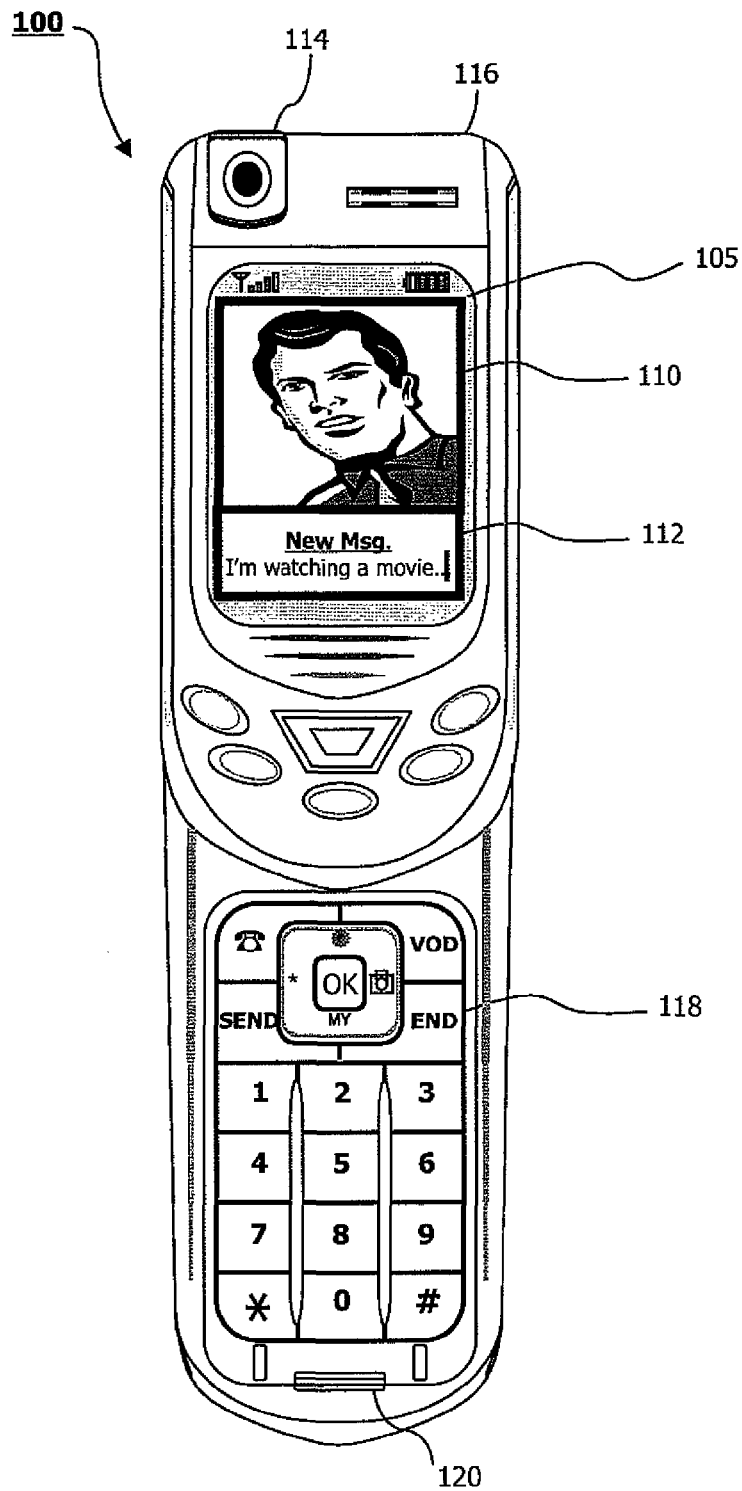
FIG. 1 is an overview of a mobile terminal having two display portions according to the present invention.

FIG. 1 illustrates a mobile terminal 100 having two display portions according to the present invention. As shown, the mobile terminal 100 includes a display unit 105 having a first display portion 110 for displaying a list (icons) of all usable tasks (modules) and a performance screen of a corresponding task and for outputting a main image, for example. The display unit 105 also includes a second display portion 112 for displaying a list of specific tasks and a performance screen of a corresponding task, and also for outputting an additional image, for example. The mobile terminal 100 also includes a camera 114 for taking pictures such as a stationary image, a moving image, etc., a speaker 116 for outputting various audio signals such as voice, music, sound effects, etc., a key pad 118 for inputting a phone number and various control commands, and a microphone 120 for inputting a user's voice, etc.

Further, the first display portion 110 outputs a list of all usable tasks of the mobile terminal 100 such as a main idle screen, mobile phone management tasks such as a menu screen, a dial setting, a language setting, a ring tone/volume setting, a vibration mode setting, etc. The first display 110 also outputs message management options allowing a user to write, receive and send messages. Other options are also provided allowing the user to replay music or video segments, display and take pictures or movies, record voice or other sounds, access the Internet, enter and read data in an electronic diary, etc. A performance screen of a corresponding task is also provided. That is, when a task is selected, a screen related to the performance of that task is displayed.

Further, when the first display portion 110 is occupied by another program or the first display portion 110 is turned off (e.g., when the user closes the folder portion of the mobile terminal 100), the second display portion 112 displays a sub-idle screen showing a date, a time, a remaining battery amount, information indicating whether or not a message has been received, etc. The second display portion 112 also displays a list of specific tasks that can be displayed in the second display portion 112 and a corresponding performance screen.

In a preferred embodiment of the present invention, various functions such as displaying a menu options list, converting or changing a process performed on one of the display portions, and/or displaying a list of tasks are performed based on selecting a certain function key. The function key includes, for example, a menu display key, a task list display key, and a toggle execution key. The menu display key, task list display key, and screen toggle execution key may be a single key designated for the particular function or may be a combination of input keys (this is discussed in more detail below). Further, the function key may be positioned at the key pad 118 of the mobile terminal 100 or at a lateral surface of the mobile terminal 100.

As noted above, selecting the various functions of the present invention may be performed using a variety of key input methods. For example, the key input methods include a short key method in which one key is pressed for a short period of time, a long key method in which one key is pressed for a longer period of time (a predetermined amount of time), or a double key method in which one key is consecutively pressed.

In the following embodiment, the short key method is used to display a list of menu options, the long key method is used to display a list of tasks, and the double key method is used to toggle between the first and second display portions 110, 112. However, other variations of the key input methods may be used. That is, the short key method may be used to execute the screen toggle function, and the double key method may be used to display a list of tasks.

Thus, in this embodiment, when the short key method is used or a menu display key is selected, a main menu is output on the first display portion 110 or a sub-menu is output on the second display portion 112. Also, when the long key method is used or a task list display key is selected, a list of tasks currently being performed is output. Further, when the double key method is used or a screen toggle execution key is selected, the first and second display portions 110, 112 are toggled between each other thereby disabling (non-activating) an activated display and activating a non-activated display.

As shown in FIG. 1, the mobile terminal 100 has a single display unit 105 divided into the first and second display portions 110, 112. However, the display portions may be separated from each other as discussed in more detail below with reference to FIG. 6.

Figure 2:
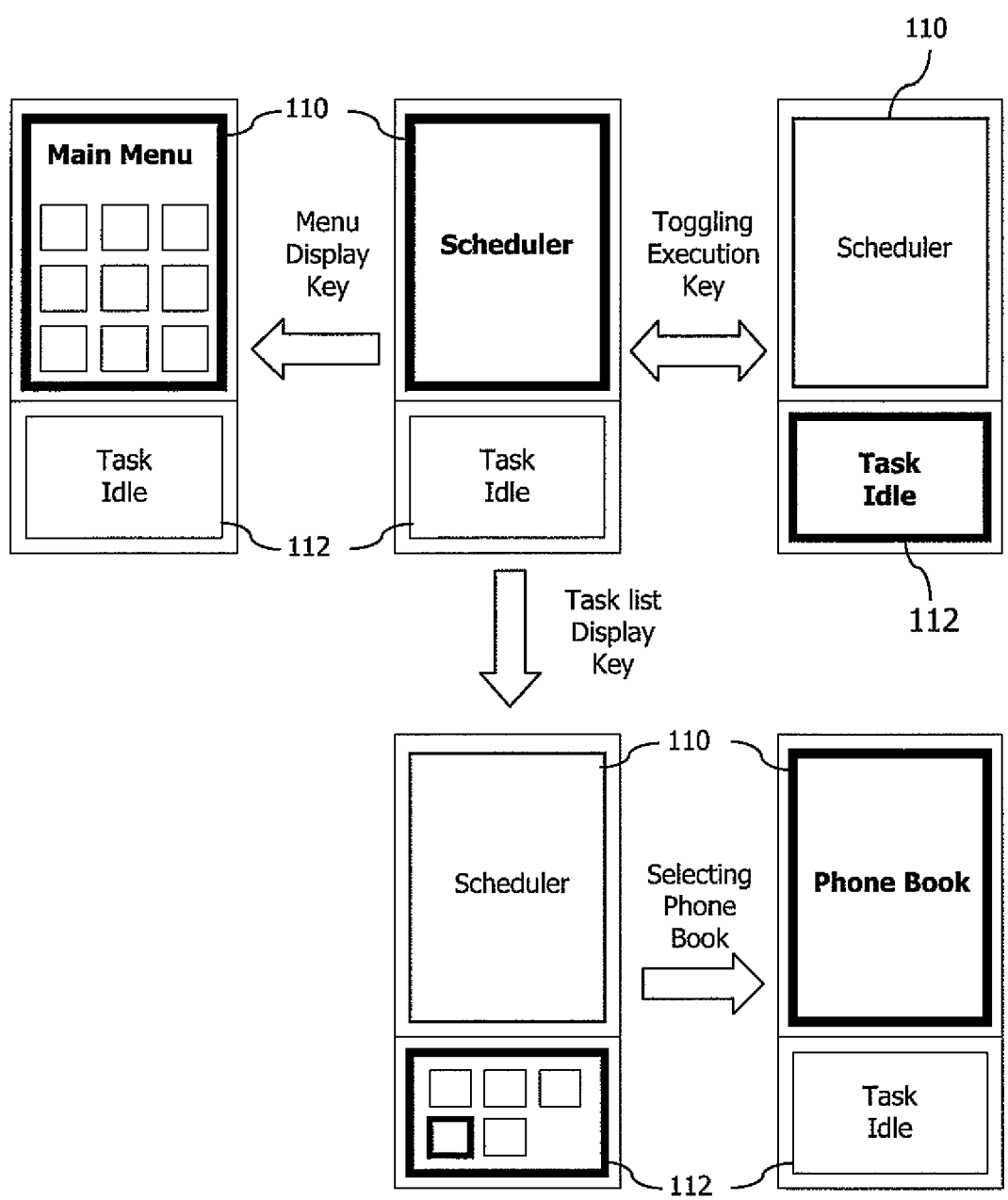
FIG. 2 is a flow diagram showing one embodiment of a mobile terminal screen changing method according to the present invention.

Turning now to FIG. 2, which is an overview showing one embodiment of the screen changing method according to the present invention. Referring to FIG. 2, the upper large square denotes the first display portion 110, the lower small square denotes the second display portion 112, and the thick line surrounding the respective display portions denotes an activated state. In the activated state, a backlight in the mobile terminal is turned on, a task may be executed and key input is possible. Further, in the non-activated state, inputting information is not possible (e.g., the window is locked).

As shown in FIG. 2, when at least one task such as a scheduler is performed on the first display portion 110, and the second display portion 112 is in an idle mode, if the function key is selected using the short key method or the menu display key is pressed, the first display portion 110 outputs a main menu showing a list of tasks that can be executed in the mobile terminal 100. That is, the current process (scheduler) displayed in the first display portion 110 is changed into another process (displaying a list of menu options). Further, as shown in the left side of FIG. 2, the first display portion 110 is activated, and the second display portion 112 is not activated.

Also, when at least one task such as a scheduler is performed on the first display portion 110 and the second display portion 112 is in an idle mode, if the function key is selected using the double key method or the screen toggle execution key is pressed, the second display portion 112 that was in an idle mode is activated and the first display portion 110 is de-activated (see the right side of FIG. 2). Further, when the second display portion 112 is in the activated state, if the function key is selected using the double key method or the screen toggle execution key is pressed, the first display portion 110 is activated and the second display portion 112 is de-activated. Thus, the display portions 110, 112 are toggled between each other.

In addition, as shown in the middle and bottom portions of FIG. 2, when at least one task such as a scheduler is performed on the first display portion 110 and the second display portion 112 is in an idle mode, if the function key is selected using the long key method or the task list display key is pressed, the second display portion 112 is activated and a list of all tasks currently being performed is displayed on the second display portion 112. At this time, when one task is selected in the list displayed on the second display portion 112, a corresponding task is performed on the first display portion 110. That is, the selected task (e.g., the phone book task) is performed on the first display portion 110 as shown on the bottom right side in FIG. 2.

Further, according to the present invention, if a user is playing a game on the first display portion 110 of the mobile terminal 100 and simultaneously receives a text message, information indicating a text message has been received is displayed on the second display portion 112. At this time, if the user selects the function key using the long key method or presses the task list display key, the second display portion 112 displays a list of all the tasks currently being performed.

For example, if the user was also downloading data from the Internet using the mobile terminal 100 while playing the game, the second display portion 112 would display icons corresponding to 1) downloading the data using the wireless Internet, 2) the game being played and 3) the received text message. Further, if the user then selects the wireless download icon to thereby determine a download state of the content, a window is displayed on the first display portion 110 indicating the current status of the download, and the text message reception window is displayed on the second display portion 112.

If the user then selects the function key using the double key method or presses the screen toggle key, the second display portion 112 is activated and thereby the user can read the received text message and reply to the text message using the second display portion 112. In addition, if the user wants to refer to a telephone directory when writing a text message, the user can select the function key using the short key method or press the menu display key. Then, the user can select a telephone directory on the main menu window of the first display portion 110 to thereby search telephone numbers.

In this instance, if the user selects the function key using the double key method or presses the screen toggle execution key, the second display portion 112 is reactivated such that the user can write and send a text message using the second display portion 112. Upon completion of writing and sending the text message, the telephone directory is displayed on the first display portion 110, and a sub-idle screen is displayed on the second display portion 112. Under this state, the user can select the function key using the long key method or press the task list display key to display a list of tasks such as the game task, download task, etc. The user can then select the game task, for example, to continue playing the game.

Figure 3:
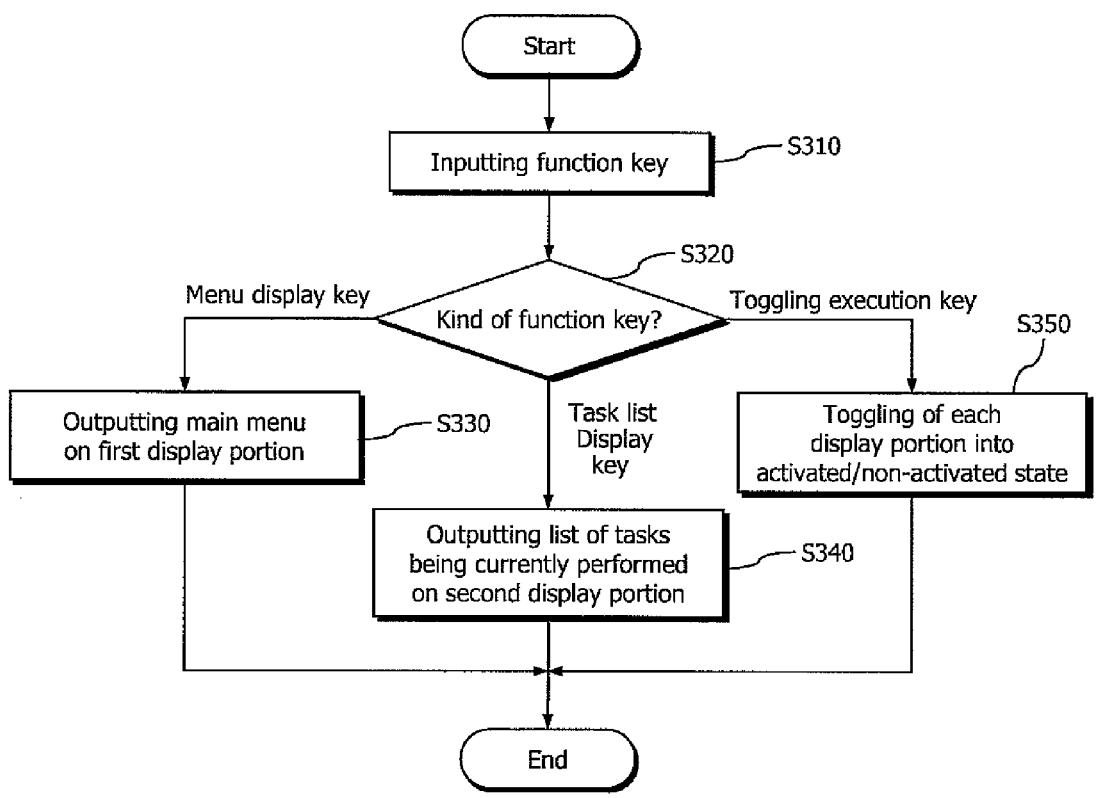
FIG. 3 is a flowchart for the screen changing method shown in FIG. 2.

Turning next to FIG. 3, which is a flowchart showing the screen changing method in FIG. 2. Referring to FIG. 3, when the function key is initially selected (S310), the mobile terminal 100 determines the type of the function key (S320). If it is determined the function key is the menu display key, a main menu is displayed on the first display portion 110 (S330).

If it is determined the function key is the task list display key, a list of all the tasks currently being performed is displayed on the second display portion 112 (S340). Also, if it is determined the function key is the screen toggle execution key, the activation status of the first and second display portions 110 and 112 are toggled (S350). As discussed above, a variety of methods may be used to designate the different function keys.

Figure 4:
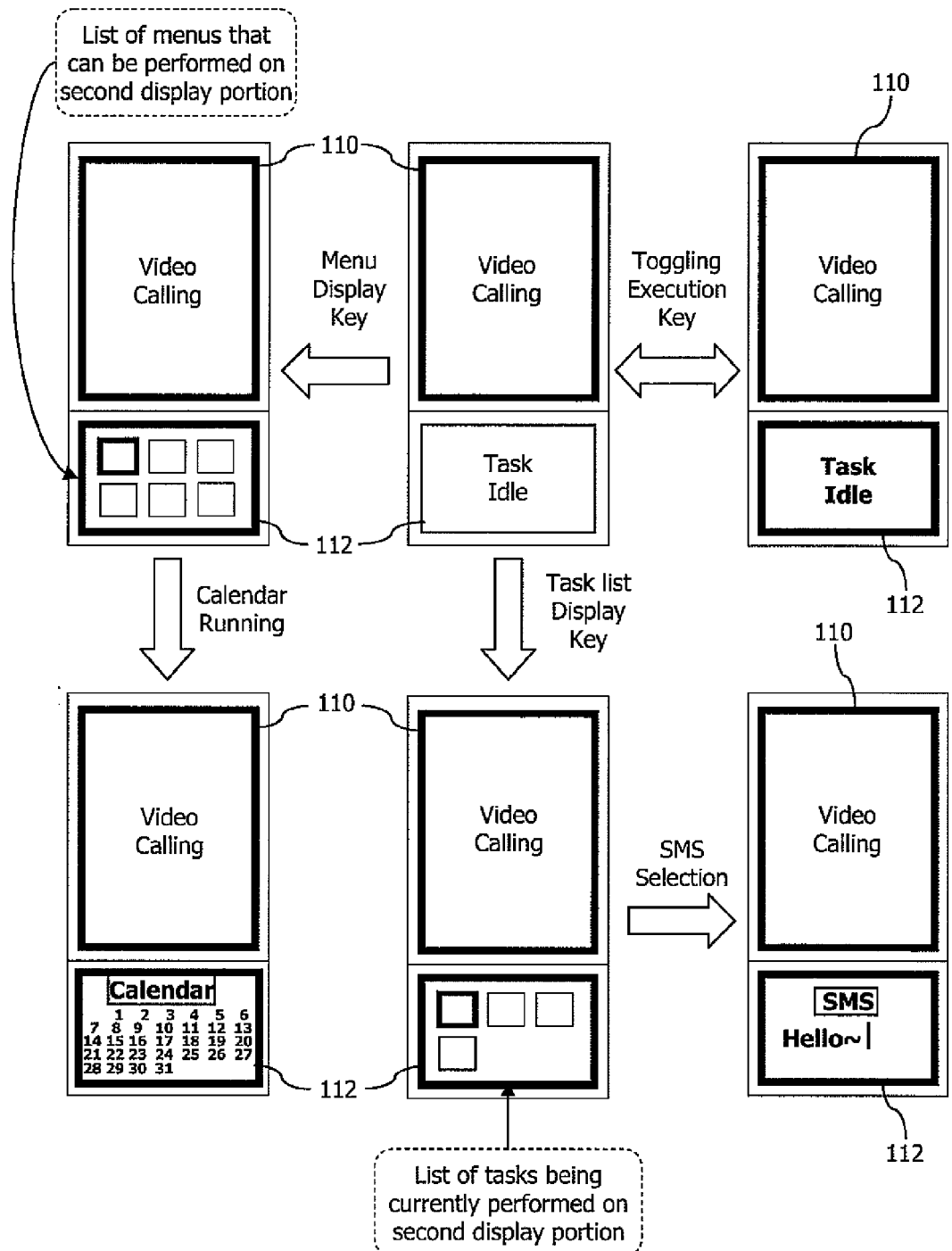
FIG. 4 is a flowdiagram showing another embodiment of a mobile terminal screen changing method according to the present invention.

Next, FIG. 4 is a view showing another embodiment of the screen changing method according to the present invention. Referring to FIG. 4, the task currently being performed on the first display portion 110 corresponds to a video calling (voice/image calling) task or a video on demand (VOD) task. The voice calling and VOD tasks are connected to a network and require that an image be continuously output (hereinafter, also referred to as a screen occupation task). Further, because these screen occupation tasks generally charge the user a predetermined fee, it is preferable the screen occupation tasks not be interrupted.

As shown in the upper middle portion of FIG. 4, when a screen occupation task such as a video calling task is performed on the first display portion 110 and the second display portion 112 is in an idle mode, if the user selects the function key using a short key method or presses the menu display key, a sub-menu of specific tasks that can be performed on the second display portion 112 is displayed on the second display portion 112, rather than the main menu being displayed on the first display portion 110. This is because it is preferable not to interrupt the screen occupation task performed on the first display portion 110. In addition, if the user then selects a task such as a calendar in the outputted sub-menu, the corresponding task is output on the second display portion 112 so as not to interrupt the voice call being performed on the first display portion 110 (see the bottom left side of FIG. 2).

Further, when a screen occupation task such as a video call is performed on the first display portion 110 and the second display portion 112 is in an idle mode, if the user selects the function key using a double key method or presses the screen toggle execution key, the second display portion 112 that is in an idle mode is activated as in FIG. 2. However, the video call screen occupation task performed in the first display unit 110 is not interrupted. Also, if the user again selects the function key using a double key method or presses the screen toggle execution key, the second display portion 112 is de-activated.

In addition, when a screen occupation task such as a video call is performed on the first display portion 110 and the second display portion 112 is in an idle mode, if the user presses the function key using a long key method or presses the task list display key, a list of tasks currently being performed is displayed on the second display portion 112. If the user selects one of the displayed tasks, the corresponding task is performed on the second display portion 112. However, the screen occupation task performed in the first display portion 110 is not interrupted.

Figure 5:
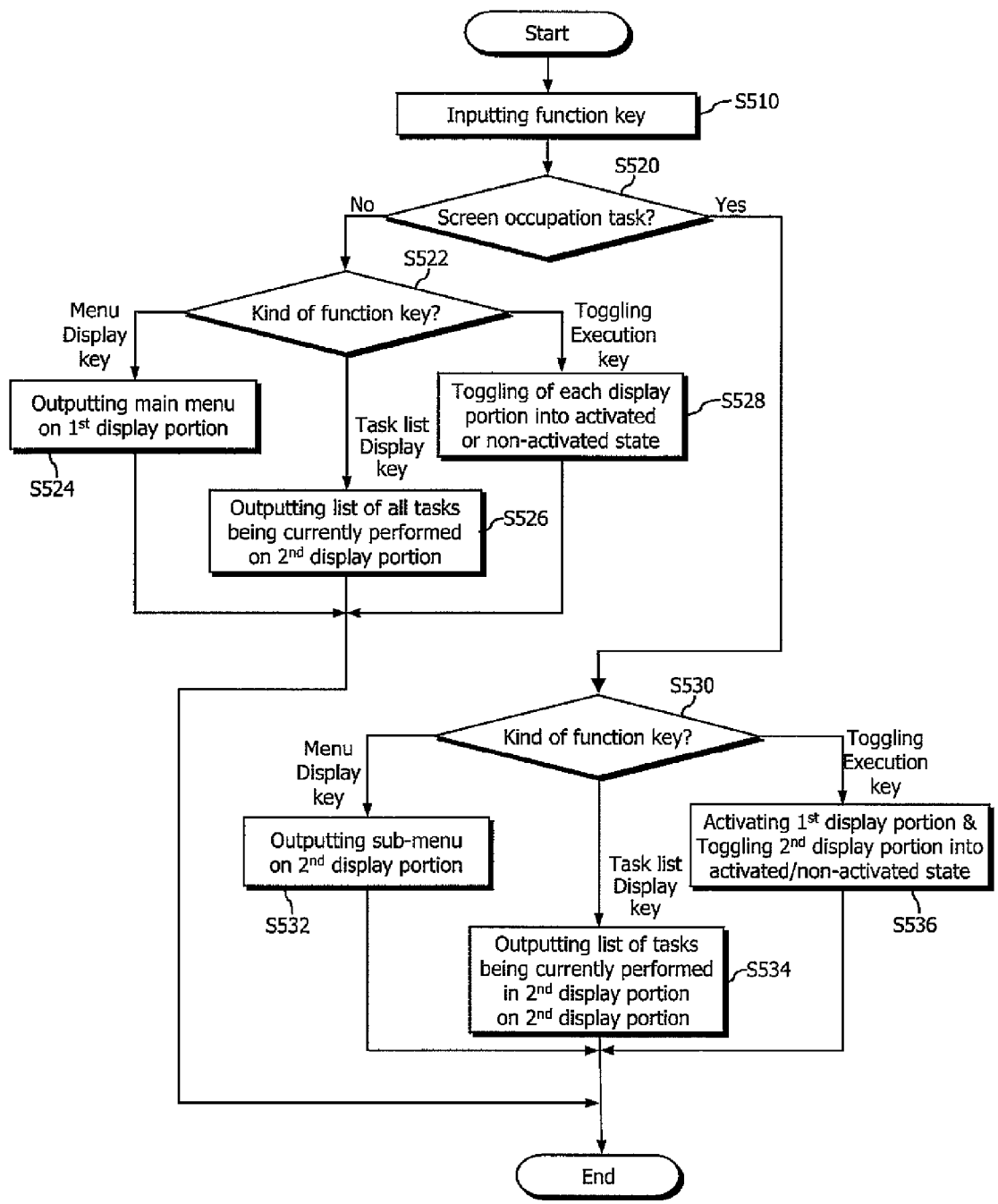
FIG. 5 is a flowchart for the screen changing method shown in FIG. 4.

Turning next to FIG. 5, which is a flowchart showing the screen changing method of FIG. 4. Referring to FIG. 5, when the function key is initially selected (S510), the mobile terminal 100 determines whether or not a performance task displayed on a current screen is a screen occupation task (S520).

As a result of the determination, if the performance task displayed on the current screen is not a screen occupation task (No in S520), the mobile terminal 100 determines the type of the function key (S522). If the mobile terminal 100 determines the input function key is the menu display key, a main menu is displayed on the first display portion 110 (S524). If it is determined the inputted function key is the task list display key, a list of all the tasks being currently performed in the mobile terminal is displayed on the second display portion 112 (S526). Also, if it is determined the function key is the screen toggle execution key, the activation states of the first and second display portions 110, 112 are switched (S528). Note, steps S522, S524, S526 and S528 are similar to the steps shown in FIG. 3.

Returning to step S520 in FIG. 5, if it is determined the performance task displayed on the current screen is a screen occupation task (Yes in S520), the mobile terminal 100 determines the type of the function key (S530). As the result of the determination, if the input function key is the menu display key, a sub-menu including a list of tasks that can be performed on the second display portion 112 is displayed on the second display portion 112 (S532). If the selected function key is the task list display key, a list of all tasks currently being performed is displayed on the second display portion 112 (S534). Also, if the function key is the screen toggle execution key, the screen occupation task is not interrupted, and only an activation state of the second display portion 112 is toggled (S536).

Further, according to the present invention, the user can advantageously designate an arbitrary task as a screen occupation task or release a screen occupation task. For example, the user can designate a specific task such as VOD task, music on demand (MOD) task, a game, etc. in which a fee is charged as a screen occupation task using a menu feature or setting, etc. so the specific task is not interfered with. Further, if the user does not want to be interfered when writing a short message, for example, a short message service (SMS) can be designated as a screen occupation task.

As discussed above, in the screen changing method according to the present invention, the user's current operation can be performed without being influenced by another operation thereby allowing the user to perform simultaneous operations. Further, various functions such as displaying a list of menu options, performing a screen changing process, displaying a list of tasks, are performed using a single key with various input methods to better utilize the limited number of keys on the mobile terminal.

Figure 6:
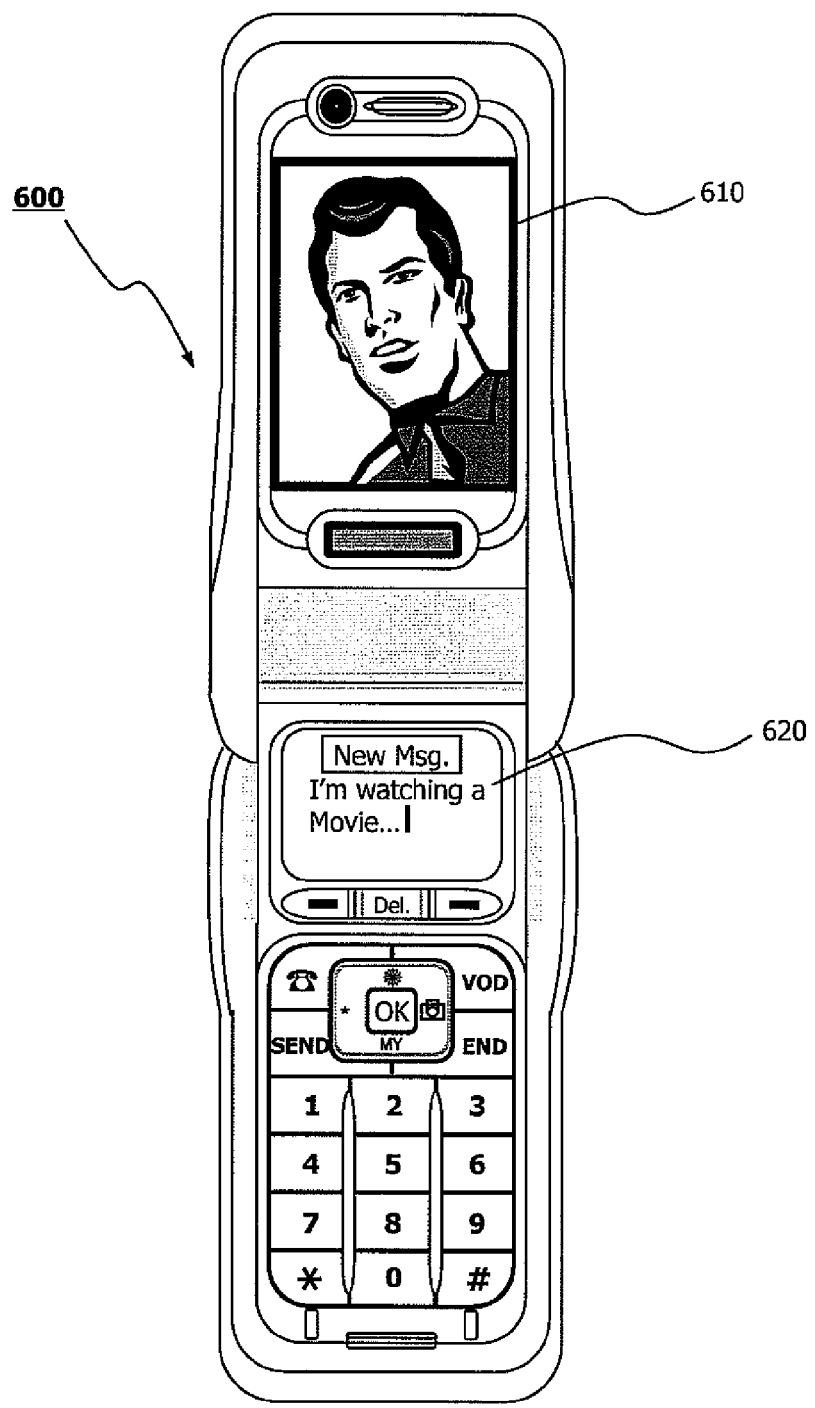
FIG. 6 is an overview of a mobile terminal having two display units according to another embodiment of the present invention.

Next, FIG. 6 illustrates a mobile terminal 600 according to another embodiment of the present invention. As shown, the mobile terminal 600 includes a display unit having two display portions 610 and 620. In this embodiment, the first display portion 610 is separated from the second display portion 620. Other variations of the first and second display portions may also be used.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal having a first display portion and a second display portion, the method comprising:
   determining a type of a first task being executed and displayed on the first display portion of the mobile terminal upon detection of an activation of a function key configured for a second task to be executed and displayed on the second display portion of the mobile terminal, wherein the type of the first task is designated as either a screen occupation task or a non-screen occupation task, and wherein the second display portion is a part of the first display portion; and
   disabling the function key to cancel execution of the second task and maintaining the first task displayed on the first display portion of the mobile terminal when the type of the first task displayed on the first display portion is determined as the screen occupation task and displaying the second task on the second display portion of the mobile terminal when the type of the first task displayed on the first display portion is determined as the non-screen occupation task.

2. The method of claim 1, wherein the type of the first task is designated or released using a menu option of the mobile terminal.

3. The method of claim 1, wherein the screen occupation task is a camera function.

4. The method of claim 1, wherein the second task comprises a display of a main menu when the activation of the function key is based on a short key method.

5. The method of claim 1, wherein the second task comprises a display of a task list when the activation of the function key is based on a long key method.

6. A method of controlling a mobile terminal having a first display portion and a second display portion, the method comprising:
   determining a type of a first task being executed and displayed on the first display portion of the mobile terminal upon detection of an activation of a function key configured for a second task to be executed and displayed on the second display portion of the mobile terminal, wherein the type of the first task is designated as either a screen occupation task or a non-screen occupation task;
   maintaining the first task displayed on the first display portion of the mobile terminal when the type of the first task displayed on the first display portion is determined as the screen occupation task;
   identifying a key input method used in the selection of the function key; and
   performing a function designated for the selection of the function key on the second display portion based on the key input method, wherein the second display portion is separate from the first display portion.

7. The method of claim 6, wherein the function includes displaying a sub menu on the second display portion when the key input method is a short key method.

8. The method of claim 6, wherein the function includes displaying a list of tasks being currently performed on the second display portion when the key input method is a long key method.

9. The method of claim 6, wherein the function includes toggling the second display portion between an activated state and a non-activated state when the key input method is a double key method.

10. The method of claim 6, wherein the screen occupation task is designated or released using a menu option of the mobile terminal.

11. The method of claim 6, wherein the screen occupation task is a video on demand (VOD) task.

12. The method of claim 6, wherein the screen occupation task is a music on demand (MOD) task.

13. The method of claim 6, wherein the screen occupation task is a camera function.

14. The method of claim 6, wherein the screen occupation task is a game.

15. A mobile terminal comprising:
   a display unit including a first display portion and a second display portion;
   a key pad configured to process a key input; and
   a controller configured to determine a type of a first task being executed and displayed on the first display portion of the mobile terminal upon detection of an activation of a function key configured for a second task to be executed and displayed on the second display portion of the mobile terminal, and to disable the function key and maintain the first task displayed on the first display portion of the mobile terminal when the type of the first task displayed on the first display portion is determined as a screen occupation task and displaying the second task on the second display portion of the mobile terminal when the type of the first task displayed on the first display portion is determined as the non-screen occupation task,
   wherein the first type of the task is designated as either the screen occupation task or a non-screen occupation task and the second display portion is a part of the first display portion.

16. The mobile terminal of claim 15, further comprising:
   a camera for performing a camera function,
   wherein the camera function is designated as the screen occupation task.

17. The mobile terminal of claim 15, wherein the type of the first task is designated or released using a menu option of the mobile terminal.

18. A mobile terminal comprising:
   a display unit including a first display portion and a second display portion;
   a key pad configured to process a key input; and
   a controller configured to determine a type of a first task being executed and displayed on the first display portion of the mobile terminal upon detection of an activation of a function key for a second task to be executed and displayed on the second display portion of the mobile terminal based on a key input method, to maintain the first task displayed on the first display portion of the mobile terminal when the type of the first task displayed on the first display portion is determined as a screen occupation task, to identify the key input method used in the selection of the function key, and to perform a function designated for the selection of the function key on the second display portion based on the key input method,
   wherein the type of the first task is designated as either the screen occupation task or a non-screen occupation task and the second display portion is separate from the first display portion.

19. The mobile terminal of claim 18, wherein the function includes displaying a sub menu on the second display portion when the key input method is a short key method.

20. The mobile terminal of claim 18, wherein the function includes displaying a list of tasks being currently performed on the second display portion when the key input method is a long key method.

21. The mobile terminal of claim 18, wherein the function includes toggling the second display portion between an activated state and a non-activated state when the key input method is a double key method.

22. The mobile terminal of claim 18, wherein the type of the first task is designated or released using a menu option of the mobile terminal.

* * * * *